United States Patent
Hirose et al.

(10) Patent No.: US 11,165,058 B2
(45) Date of Patent: Nov. 2, 2021

(54) NEGATIVE ELECTRODE ACTIVE MATERIAL, MIXED NEGATIVE ELECTRODE ACTIVE MATERIAL, AND METHOD OF PRODUCING NEGATIVE ELECTRODE ACTIVE MATERIAL

(71) Applicant: SHIN-ETSU CHEMICAL CO., LTD., Tokyo (JP)

(72) Inventors: Takakazu Hirose, Annaka (JP); Kohta Takahashi, Takasaki (JP); Takumi Matsuno, Annaka (JP); Reiko Sakai, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/332,136

(22) PCT Filed: Aug. 23, 2017

(86) PCT No.: PCT/JP2017/030044
§ 371 (c)(1),
(2) Date: Mar. 11, 2019

(87) PCT Pub. No.: WO2018/061536
PCT Pub. Date: Apr. 5, 2018

(65) Prior Publication Data
US 2019/0229332 A1      Jul. 25, 2019

(30) Foreign Application Priority Data

Sep. 30, 2016   (JP) ............................. JP2016-194120
Apr. 6, 2017    (JP) ............................. JP2017-076133

(51) Int. Cl.
*H01M 4/48*   (2010.01)
*H01M 4/62*   (2006.01)
(Continued)

(52) U.S. Cl.
CPC ........... *H01M 4/483* (2013.01); *C01B 33/113* (2013.01); *C01B 33/32* (2013.01); *H01M 4/36* (2013.01);
(Continued)

(58) Field of Classification Search
CPC ........ H01M 4/483; H01M 4/36; H01M 4/364; H01M 4/48; H01M 4/587; H01M 4/628;
(Continued)

(56) References Cited

U.S. PATENT DOCUMENTS 5,395,711 A    3/1995   Tahara et al.
7,459,236 B2   12/2008  Konishiike et al.
(Continued)

FOREIGN PATENT DOCUMENTS

CN    105474438 A    4/2016
CN    105917499 A    8/2016
(Continued)

OTHER PUBLICATIONS

JP2015149224A_Description_202108191306—Machined Translation (Year: 2015).*
(Continued)

*Primary Examiner* — Brian R Ohara
*Assistant Examiner* — Patrick Marshall Greene
(74) *Attorney, Agent, or Firm* — Oliff PLC

(57) ABSTRACT

A negative electrode active material contains a negative electrode active material particle; the negative electrode active material particle including a silicon compound particle containing a silicon compound ($SiO_x$: $0.5 \leq x \leq 1.6$), wherein the silicon compound particle contains a Li compound, and the negative electrode active material particle contains at least one kind of salt selected from salts of polyacrylic acid and salts of carboxymethyl cellulose, together with a metal salt containing at least one kind of
(Continued)

metal selected from Mg and Al. This provides a negative electrode active material that is capable of stabilizing slurry that is produced in production of a negative electrode for a secondary battery, and improving initial charge-discharge characteristics and cycle performance when it is used as a negative electrode active material for a secondary battery.

16 Claims, 2 Drawing Sheets

(51) Int. Cl.
    *H01M 4/36*     (2006.01)
    *H01M 4/02*     (2006.01)
    *H01M 4/587*     (2010.01)
    *C01B 33/32*     (2006.01)
    *C01B 33/113*     (2006.01)

(52) U.S. Cl.
    CPC ............ *H01M 4/364* (2013.01); *H01M 4/48* (2013.01); *H01M 4/587* (2013.01); *H01M 4/628* (2013.01); *C01P 2002/60* (2013.01); *C01P 2002/72* (2013.01); *C01P 2002/86* (2013.01); *C01P 2004/61* (2013.01); *C01P 2004/80* (2013.01); *C01P 2006/40* (2013.01); *H01M 2004/027* (2013.01)

(58) Field of Classification Search
    CPC ........... H01M 2004/027; C01B 33/113; C01B 33/32; C01P 2002/60; C01P 2002/72; C01P 2002/86; C01P 2004/61; C01P 2004/80; C01P 2006/40
    See application file for complete search history.

(56) References Cited

U.S. PATENT DOCUMENTS

| | | | |
|---|---|---|---|
| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2016/0141626 | A1* | 5/2016 | Hosaka ................ H01M 4/134 429/217 |
| 2016/0233484 | A1 | 8/2016 | Hirose et al. |
| 2016/0254537 | A1 | 9/2016 | Kamo et al. |
| 2016/0344015 | A1* | 11/2016 | Kimura ................ H01M 4/133 |
| 2016/0351947 | A1 | 12/2016 | Kamo et al. |
| 2017/0040599 | A1 | 2/2017 | Kamo et al. |
| 2018/0151873 | A1 | 5/2018 | Matsuno et al. |
| 2019/0221836 | A1 | 7/2019 | Hirose et al. |

FOREIGN PATENT DOCUMENTS

| | | | | |
|---|---|---|---|---|
| CN | 105981203 | A | | 9/2016 |
| EP | 3306711 | A1 | | 4/2018 |
| EP | 3062371 | B1 | * | 11/2018 ............ H01M 4/366 |
| EP | 3514866 | A1 | | 7/2019 |
| JP | 2997741 | B2 | | 1/2000 |
| JP | 2001-185127 | A | | 7/2001 |
| JP | 2002-042806 | A | | 2/2002 |
| JP | 2006-114454 | A | | 4/2006 |
| JP | 2006-164954 | A | | 6/2006 |
| JP | 2007-234255 | A | | 9/2007 |
| JP | 2008-177346 | A | | 7/2008 |
| JP | 2008-251369 | A | | 10/2008 |
| JP | 2008-282819 | A | | 11/2008 |
| JP | 2009-070825 | A | | 4/2009 |
| JP | 2009-205950 | A | | 9/2009 |
| JP | 2009-212074 | A | | 9/2009 |
| JP | 2014-103052 | A | | 6/2014 |
| JP | 2015-149224 | A | | 8/2015 |
| JP | 2015-156355 | A | | 8/2015 |
| JP | 2015149224 | A | * | 8/2015 .......... H01M 4/0404 |
| JP | 2016-066508 | A | | 4/2016 |
| JP | 2016-066529 | A | | 4/2016 |
| JP | 2016-164870 | A | | 9/2016 |
| KR | 10-2016-0110380 | A | | 9/2016 |
| TW | 201715773 | A | | 5/2017 |
| WO | 2014/200003 | A1 | | 12/2014 |

OTHER PUBLICATIONS

Oct. 10, 2017 International Search Report issued in International Patent Application No. PCT/JP2017/030044.
Apr. 24, 2020 Extended European Search Report issued in European Patent Application No. 17855494.5.
May 26, 2020 Japanese Office Action issued in Japanese Patent Applicationn No. 2017-076133.
Sep. 21, 2020 Office Action issued in Taiwanese Patent Application No. 106129125.
May 17, 2021 Office Action issued in Korean Patent Application No. 10-2019-7008769.
Jun. 24, 2021 Office Action issued Chinese Patent Application No. 201780057138.7.

\* cited by examiner

[FIG. 1]
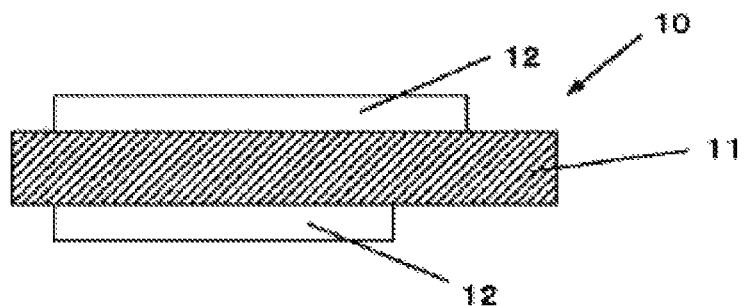
[FIG. 2]
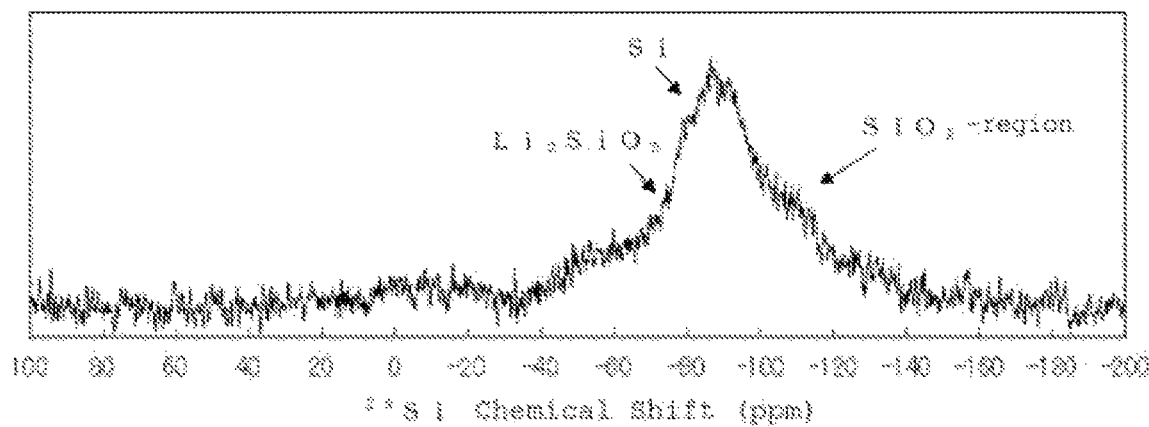
[FIG. 3]
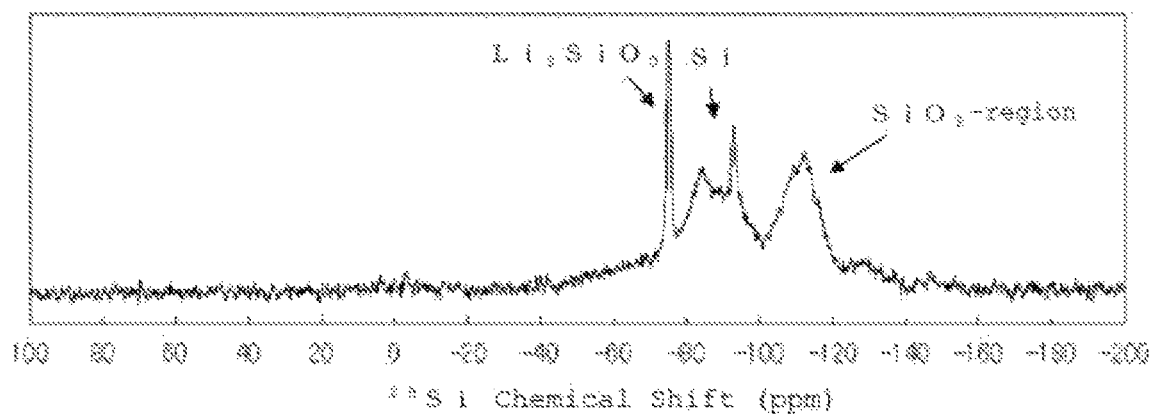

[FIG. 4]
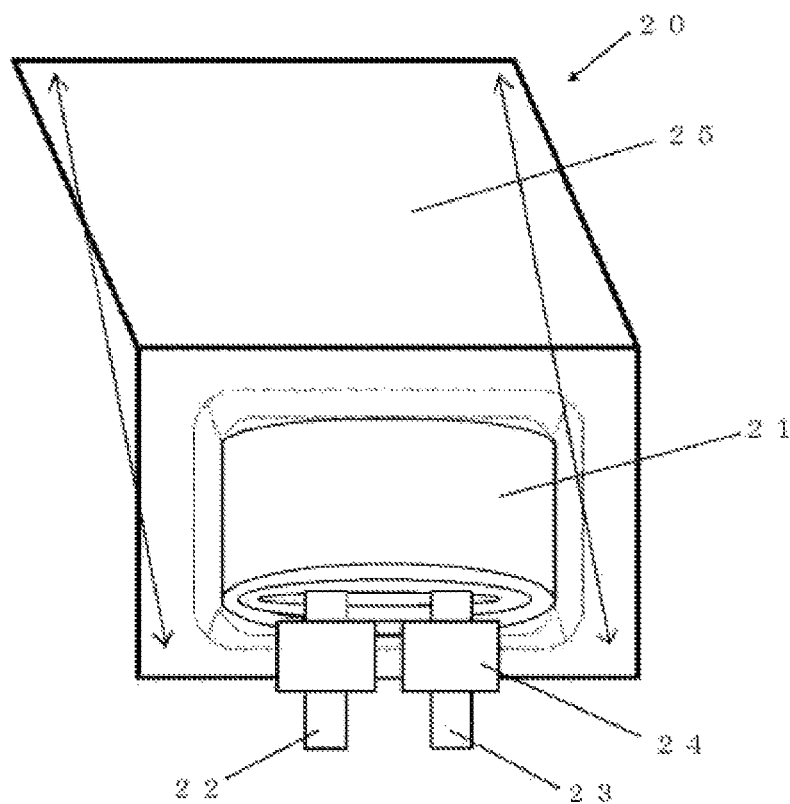
[FIG. 5]
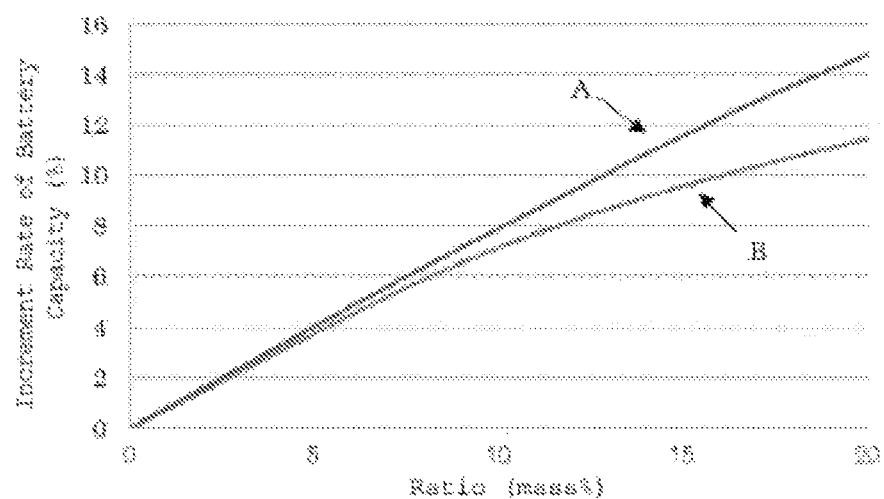

NEGATIVE ELECTRODE ACTIVE MATERIAL, MIXED NEGATIVE ELECTRODE ACTIVE MATERIAL, AND METHOD OF PRODUCING NEGATIVE ELECTRODE ACTIVE MATERIAL

TECHNICAL FIELD

The present invention relates to a negative electrode active material, a mixed negative electrode active material, and a method of producing a negative electrode active material.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon-based active materials ranges from a standard application type to an integrated type in which the materials are directly accumulated on a current collector.

Use of silicon as a main material of a negative electrode active material, however, expands or shrinks a negative electrode active material when charging or discharging, thereby making the negative electrode active material easy to break particularly near its surface layer. In addition, this active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example). Moreover, a carbon material (an electronic conduction material) is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including Si-phase, $SiO_2$, $M_yO$ metal oxide is used to improve the first charge and discharge efficiency (See Patent Document 5, for example). To improve the cycle performance, $SiO_x$ ($0.8 \leq x \leq 1.5$, the range of particle size=1 μm to 50 μm) and a carbon material are mixed and calcined at a high temperature (See Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 7, for example). Moreover, a metal oxide containing lithium is used to improve the battery load characteristic (See Patent Document 8, for example). To improve the cycle performance, a hydrophobic layer such as a silane compound layer is formed on the surface of a silicon material (See Patent Document 9, for example). Moreover, a silicon oxide is used and coated with graphite coating to give electric conductivity so that improved cycle performance is achieved (See Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle performance (See Patent Document 11, for example). Moreover, a silicon oxide having a silicon-to-oxygen atomicity ratio of 1:y ($0<y<2$) is used to improve overcharge and overdischarge performance (See Patent Document 12, for example).

CITATION LIST

Patent Literature

Patent Document 1: Japanese Unexamined Patent publication (Kokai) No. 2001-185127

Patent Document 2: Japanese Unexamined Patent publication (Kokai) No. 2002-042806

Patent Document 3: Japanese Unexamined Patent publication (Kokai) No. 2006-164954

Patent Document 4: Japanese Unexamined Patent publication (Kokai) No. 2006-114454

Patent Document 5: Japanese Unexamined Patent publication (Kokai) No. 2009-070825

Patent Document 6: Japanese Unexamined Patent publication (Kokai) No. 2008-282819

Patent Document 7: Japanese Unexamined Patent publication (Kokai) No. 2008-251369

Patent Document 8: Japanese Unexamined Patent publication (Kokai) No. 2008-177346
Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741

SUMMARY OF INVENTION

Technical Problem

As described above, small electronic devices, represented by mobile devices, have been advancing recently toward high performance and multifunction, and a lithium ion secondary battery that is main electric source thereof is required to improve a battery capacity. As a technique to solve this problem, it is desired to develop a lithium ion secondary battery containing a negative electrode using a silicon material as a main material. In case of using a silicon material, the use of a silicon material doped with Li brings higher initial efficiency and capacity retention rate. The silicon material doped with Li, however, is less stable to aqueous solvents, lowering the stability of aqueous negative electrode slurry mixed with a silicon material, which is prepared in producing a negative electrode, and has been unsuitable for industrial use.

The present invention was accomplished in view of the above-described problems. It is an object of the present invention to provide a negative electrode active material that is capable of stabilizing slurry prepared in production of a negative electrode for a secondary battery, together with improving the initial charge-discharge characteristics and cycle performance when it is used as a negative electrode active material for a secondary battery; and a mixed negative electrode active material containing this negative electrode active material. It is also an object to provide a method of producing a negative electrode active material that is capable of stabilizing slurry prepared in production of a negative electrode, together with improving the initial charge-discharge characteristics and cycle performance.

Solution to Problem

To solve the problem, the present invention provides a negative electrode active material containing a negative electrode active material particle;
the negative electrode active material particle comprising a silicon compound particle containing a silicon compound ($SiO_x$: $0.5 \leq x \leq 1.6$),
wherein the silicon compound particle contains a Li compound, and
the negative electrode active material particle contains at least one kind of salt selected from salts of polyacrylic acid and salts of carboxymethyl cellulose, together with a metal salt containing at least one kind of metal selected from Mg and Al.

The inventive negative electrode active material contains a negative electrode active material particle containing a silicon compound particle (also referred to as a silicon-based active material particle), and is capable of improving battery capacity thereby. The silicon compound particle contains a Li compound, and is capable of reducing irreversible capacity generated in charging thereby. This allows a battery to have improved initial efficiency and cycle performance.

With the negative electrode active material particle containing at least one kind of the salt selected from salts of polyacrylic acid and salts of carboxymethyl cellulose as well as the metal salt containing at least one kind of metal selected from Mg and Al, elution of a Li ion from a Li compound in the negative electrode active material particle is prevented during the preparation of slurry in which negative electrode active material and so on are dispersed in aqueous solvent (aqueous negative electrode slurry), and the aqueous negative electrode slurry is more improved in stability.

It is preferred that the total amount of the at least one kind of salt selected from the salts of polyacrylic acid and the salts of carboxymethyl cellulose be in a range of 0.1 mass % or more and 5 mass % or less relative to the total amount of the negative electrode active material particle.

When the total amount of at least one kind of the salt selected from salts of polyacrylic acid and salts of carboxymethyl cellulose is in a range of 0.1 mass % or more relative to the total amount of the negative electrode active material particle, elution of a Li ion from a Li compound in the negative electrode active material particle is further prevented, and the aqueous negative electrode slurry is more improved in stability. When the total amount of the salt(s) is 5 mass % or less relative to the total amount of the negative electrode active material particle, it is possible to prevent lowering of the battery capacity.

It is preferred that the at least one kind of salt selected from the salts of polyacrylic acid and the salts of carboxymethyl cellulose be an ammonium salt.

With the negative electrode active material like this, elution of a Li ion from a Li compound in the negative electrode active material particle is further prevented, and the aqueous negative electrode slurry is more improved in stability thereby.

It is preferred that the total amount of the metal salt containing at least one kind of metal selected from Mg and Al be in a range of 0.1 mass % or more and 5 mass % or less relative to the total amount of the negative electrode active material particle.

When the total amount of the metal salt(s) is 0.1 mass % or more relative to the total amount of the negative electrode active material particle, elution of a Li ion from a Li compound in the negative electrode active material particle is further prevented, and the aqueous negative electrode slurry is more improved in stability. When the total amount of the metal salt(s) is 5 mass % or less relative to the total amount of the negative electrode active material particle, it is possible to prevent lowering of the battery capacity.

It is preferred that the metal salt containing at least one kind of metal selected from Mg and Al be any of a nitrate, a phosphate, a chloride, or a sulfate.

With the negative electrode active material like this, elution of a Li ion from a Li compound in the negative electrode active material particle is further prevented, and the aqueous negative electrode slurry is more improved in stability thereby.

It is preferred that the sum of content of the at least one kind of salt selected from the salts of polyacrylic acid and the salts of carboxymethyl cellulose contained in the negative electrode active material particle on the basis of mass be smaller than the sum of content of the metal salt containing at least one kind of metal selected from Mg and Al contained in the negative electrode active material particle on the basis of mass.

With the negative electrode active material like this, elution of a Li ion from a Li compound in the negative electrode active material particle is further prevented, and the aqueous negative electrode slurry is more improved in stability thereby.

The negative electrode active material particle preferably contains at least one of $Li_2Si_2O_5$, $Li_2SiO_3$, and $Li_4SiO_4$ as the Li compound.

Containing the lithium silicate described above as the lithium compound, it is possible to reduce irreversible capacity generated in charging to improve the battery in first efficiency and cycle performance.

The silicon compound particle is preferably one that has a diffraction peak attributable to Si(111) crystal face in which the half value width (2θ) is 1.2° or more in an X-ray diffraction using Cu-Kα ray, and the size of the crystallite corresponding to the crystal face is 7.5 nm or less.

Using a negative electrode active material with the silicon compound particle having the above silicon crystallinity as a negative electrode active material for a lithium ion secondary battery, it is possible to obtain more favorable cycle performance and initial charge-discharge characteristics.

In the inventive negative electrode active material, the silicon compound particle is preferably one that satisfies a relationship of A>B where A is a maximum peak intensity derived from Si and Li silicate region given in the chemical shift value of −60 to −95 ppm, and B is a peak intensity derived from $SiO_2$-region given in the chemical shift value of −96 to −150 ppm, each obtained from a $^{29}$Si-MAS-NMR spectrum.

With the silicon compound particle in which the amount of Si and $Li_2SiO_3$ is larger than that of $SiO_2$ component, the negative electrode active material is allowed to obtain sufficient effect for improving the battery properties by Li insertion.

It is preferred that the median diameter of the negative electrode active material particle be 3 μm or more and 15 μm or less.

When the median diameter of the negative electrode active material particles is 3 μm or more, it is possible to prevent an increase of battery irreversible capacity due to an increase of the surface area per mass. On the other hand, when the median diameter is 15 μm or less, the particles are less liable to break, thereby being prevented from forming a new surface.

It is preferred that the negative electrode active material particle have a surface layer portion containing a carbon material.

When the negative electrode active material particle contains a carbon material at the surface layer portion as described above, the electric conductivity is successfully improved.

It is preferred that the average thickness of the carbon material be 5 nm or more and 5000 nm or less.

When the average thickness of the carbon material is 5 nm or more, the electric conductivity is successfully improved. When the average thickness of the carbon material coating is 5000 nm or less, it is possible to secure sufficient amount of silicon compound particle using a negative electrode active material containing the negative electrode active material particles like this for a lithium ion secondary battery, thereby making it possible to prevent lowering of the battery capacity.

To achieve the objects described above, the present invention further provides a mixed negative electrode active material, comprising the negative electrode active material described above and a carbon-based active material.

When the material for forming a negative electrode active material layer contains a carbon-based active material together with the inventive negative electrode active material (silicon-based negative electrode active material), it is possible to improve the electric conductivity of the negative electrode active material layer and to ease the expanding stress due to charging. The battery capacity is also increased successfully by mixing a silicon-based negative electrode active material and a carbon-based active material.

To achieve the objects described above, the present invention provides a method of producing a negative electrode active material containing a negative electrode active material particle including a silicon compound particle, comprising:

preparing a negative electrode active material particle, comprising:

preparing a silicon compound particle containing a silicon compound ($SiO_x$: 0.5≤x≤1.6), and inserting Li into the silicon compound particle to form a Li compound contained therein;

making the negative electrode active material particle contain at least one kind of salt selected from salts of polyacrylic acid and salts of carboxymethyl cellulose, together with a metal salt containing at least one kind of metal selected from Mg and Al;

using the negative electrode active material particle containing the at least one kind of salt selected from the salts of polyacrylic acid and the salts of carboxymethyl cellulose, together with the metal salt containing at least one kind of metal selected from Mg and Al, to produce a negative electrode active material.

In the production of a negative electrode active material with the negative electrode active material particle containing the salts described above, it is possible to produce a negative electrode active material that allows to stabilize the aqueous negative electrode slurry prepared in production of a negative electrode especially, and successfully brings higher capacity as well as favorable cycle performance and initial charge-discharge characteristics when it is used as a negative electrode active material for a lithium ion secondary battery.

Advantageous Effects of Invention

The inventive negative electrode active material allows to stabilize the aqueous negative electrode slurry prepared in production of a negative electrode especially, and brings higher capacity as well as favorable cycle performance and initial charge-discharge characteristics when it is used as a negative electrode active material for a secondary battery. The mixed negative electrode active material containing this negative electrode active material also brings the same effects. The inventive method of producing a negative electrode active material makes it possible to produce a negative electrode active material that allows to stabilize the aqueous negative electrode slurry prepared in production of a negative electrode, and also brings favorable cycle performance and initial charge-discharge characteristics when it is used as a negative electrode active material for a lithium ion secondary battery.

BRIEF DESCRIPTION OF DRAWINGS

FIG. 1 is a sectional view showing an example of configuration of a negative electrode for a non-aqueous electrolyte secondary battery that contains the inventive negative electrode active material;

FIG. 2 is an example of $^{29}$Si-MAS-NMR spectrum measured for the silicon compound particle when it is modified by oxidation and reduction method;

FIG. 3 is an example of $^{29}$Si-MAS-NMR spectrum measured for the silicon compound particle when it is modified by thermal doping method;

FIG. 4 is a diagram showing an example of a configuration of a lithium ion secondary battery (laminate film type) that contains the inventive negative electrode active material;

FIG. 5 is a graph showing relationship between the ratio of silicon-based active material particles relative to the whole amount of negative electrode active material and an increment rate of battery capacity of a secondary battery.

DESCRIPTION OF EMBODIMENTS

Hereinafter, embodiments of the present invention will be described, but the present invention is not limited thereto.

As described above, for increasing battery capacity of lithium ion secondary batteries, it has been investigated a method using a negative electrode mainly made from a silicon material as a negative electrode for a lithium ion secondary battery. In particular, a silicon material doped with Li is improved in initial charge-discharge characteristics and cycle performance, but has a problem of lowering the stability of aqueous negative electrode slurry containing such a silicon material. Accordingly, it has not been proposed a negative electrode active material to give slurry stability, initial charge-discharge characteristics, and cycle performance that are equal to those of a lithium ion secondary battery using carbon-based active material.

Accordingly, the inventors have diligently investigated to obtain a negative electrode active material used for a secondary battery to give higher battery capacity, as well as favorable slurry stability, cycle performance, and initial charge-discharge characteristics; thereby providing the present invention.

The inventive negative electrode active material contains a negative electrode active material particle. This negative electrode active material particle contains a silicon compound particle containing a silicon compound (SiO$_x$: 0.5≤x≤1.6), and this silicon compound particle contains a Li compound. The negative electrode active material particle also contains at least one kind of salt selected from salts of polyacrylic acid and salts of carboxymethyl cellulose. The negative electrode active material particle further contains a metal salt containing at least one kind of metal selected from Mg and Al.

The negative electrode active material like this contains a negative electrode active material particle containing a silicon compound particle (also referred to as a silicon-based active material particle), and is capable of improving battery capacity thereby. In addition, the silicon compound particle contains a Li compound, which makes it possible to decrease irreversible capacity that generates in charging. This allows a battery to be improved in first efficiency and cycle performance. With the negative electrode active material particle containing both of at least one kind of the salt selected from salts of polyacrylic acid and salts of carboxymethyl cellulose as well as the metal salt containing at least one kind of metal selected from Mg and Al, elution of a Li ion from a Li compound in the negative electrode active material particle is prevented during the preparation of slurry in which negative electrode active material and so on are dispersed in aqueous solvent (aqueous negative electrode slurry), and the aqueous negative electrode slurry is more improved in stability. When the negative electrode active material particle contains only at least one kind of the salt selected from salts of polyacrylic acid and salts of carboxymethyl cellulose, the aqueous negative electrode slurry is not improved in stability. When the negative electrode active material particle contains only the metal salt containing at least one kind of metal selected from Mg and Al, it only exhibits slight effect to improve the stability of aqueous negative electrode slurry.

<Negative Electrode for Non-Aqueous Electrolyte Secondary Battery>

Then, a negative electrode for a non-aqueous electrolyte secondary battery containing the inventive negative electrode active material will be described. FIG. 1 is a sectional view showing an example of configuration of a negative electrode for a non-aqueous electrolyte secondary battery (hereinafter, also referred to as a "negative electrode").

[Configuration of Negative Electrode]

As shown in FIG. 1, the negative electrode 10 is constituted to have the negative electrode active material layer 12 on the negative electrode current collector 11. This negative electrode active material layer 12 may be disposed on the both sides or only one side of the negative electrode current collector 11. When the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material used for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. In particular, when the negative electrode has an active material layer that expands in charging, the current collector containing the above elements can prevent deformation of an electrode including the current collector. Each content of the contained elements is not particularly limited, but is preferably 100 ppm by mass or less. Since this improves effect of preventing deformation. Such effect of preventing deformation further improves the cycle performance.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains the inventive negative electrode active material, which is capable of occluding and releasing lithium ions. In view of battery design, other materials may be further contained, such as a negative electrode binding agent (binder) or a conductive assistant agent. The negative electrode active material contains a negative electrode active material particle, and the negative electrode active material particle contains a silicon compound particle containing a silicon compound (SiO$_x$: 0.5≤x≤1.6).

The negative electrode active material layer 12 may contain a mixed negative electrode active material that contains the inventive negative electrode active material and a carbon-based active material. This makes it possible to decrease the electric resistance of the negative electrode active material layer and to ease the expanding stress due to charging. As the carbon-based active material, pyrolytic carbons, cokes, glassy carbon fiber, baked organic polymer compounds, and carbon black are usable.

In the mixed negative electrode active material, the mass ratio of the silicon-based negative electrode active material is preferably 6 mass % or more relative to the sum of masses of the inventive negative electrode active material (silicon-based negative electrode active material) and the carbon-based active material. When the mass ratio of the silicon-based negative electrode active material is 6 mass % or more relative to the sum of masses of the silicon-based negative electrode active material and the carbon-based active material, it is possible to securely improve the battery capacity.

As described above, the inventive negative electrode active material contains a silicon compound particle, and the silicon compound particle is a silicon oxide material containing a silicon compound ($SiO_x$: $0.5 \leq x \leq 1.6$), in which "x" is preferably close to 1 because higher cycle performance is successfully obtained. Incidentally, the composition of silicon compound in the present invention does not necessarily means purity of 100%, and may contain a small quantity of impurity elements.

In the inventive negative electrode active material, the silicon compound particle preferably contains at least one of $Li_2Si_2O_5$, $Li_2SiO_3$, and $Li_4SiO_4$ as the Li compound. In these silicon compounds, $SiO_2$ component portion, which is changed to unstable during insertion and extraction of lithium in charging and discharging of the battery, is previously modified to another lithium silicate. Accordingly, the irreversible capacity generated in charging is successfully decreased.

The battery properties are improved when the silicon compound particle contains at least one of $Li_2Si_2O_5$, $Li_2SiO_3$, and $Li_4SiO_4$ in the bulk. The battery properties are more improved when two or more kinds of the Li compound are combined. Incidentally, these lithium silicates can be determined by Nuclear Magnetic Resonance (NMR) or X-ray photoelectron spectroscopy (XPS). The measurement of XPS and NMR can be performed under the following conditions, for example.

XPS
    Apparatus: an X-ray photoelectron spectroscopy apparatus
    X-ray Source: a monochromatic Al-Kα ray
    X-ray Spot Diameter: 100 μm
    Ar-ion Sputtering Gun Conditions: 0.5 kV/2 mm×2 mm $^{29}$Si-MAS-NMR (magic angle spinning-Nuclear Magnetic Resonance)
    Apparatus: a 700-NMR spectroscope made by Bruker Corp.
    Probe: a 4-mm-HR-MAS rotor, 50 μL
    Sample Rotation Speed: 10 kHz
    Temperature of Measurement Environment: 25° C.

As described above, in the inventive negative electrode active material, the negative electrode active material particle contains at least one kind of salt selected from salts of polyacrylic acid and salts of carboxymethyl cellulose, and further contains a metal salt containing at least one kind of metal selected from Mg and Al. In this inventive negative electrode active material, it is preferred that the total amount of at least one kind of the salt selected from salts of polyacrylic acid and salts of carboxymethyl cellulose be in a range of 0.1 mass % or more and 5 mass % or less relative to the total amount of the negative electrode active material particle(s). When the negative electrode active material particle contains two or more kinds of salts selected from salts of polyacrylic acid and salts of carboxymethyl cellulose, for example, the total mass of the two or more kinds of salts is preferably 0.1 mass % or more and 5 mass % or less relative to the total amount of the negative electrode active material particle(s). When only one kind of the salt is contained, the mass of the salt is preferably 0.1 mass % or more and 5 mass % or less relative to the total amount of the negative electrode active material particle(s). When the total amount of the salt(s) is in a range of 0.1 mass % or more relative to the total amount of the negative electrode active material particle(s) as described above, elution of a Li ion from a Li compound in the negative electrode active material particle is prevented quite sufficiently, and the aqueous negative electrode slurry is much improved in stability. When the total amount of the salt(s) is in a range of 5 mass % or less relative to the total amount of the negative electrode active material particle(s), the battery capacity is prevented from lowering.

In the inventive negative electrode active material, it is preferred that the total amount of the metal salt containing at least one kind of metal selected from Mg and Al be in a range of 0.1 mass % or more and 5 mass % or less relative to the total amount of the negative electrode active material particle(s). When the negative electrode active material particle contains two or more kinds of metal salts containing at least one kind of metal selected from Mg and Al as in the above, the total mass of two or more kinds of the metal salts is preferably 0.1 mass % or more and 5 mass % or less relative to the total amount of the negative electrode active material particle(s). When only one kind of the metal salt is contained, the mass of the metal salt is preferably 0.1 mass % or more and 5 mass % or less relative to the total amount of the negative electrode active material particle(s). When the total amount of the metal salt(s) is in a range of 0.1 mass % or more relative to the total amount of the negative electrode active material particle(s) as described above, elution of a Li ion from a Li compound in the negative electrode active material particle is prevented quite sufficiently, and the aqueous negative electrode slurry is much improved in stability. When the total amount of the metal salt(s) is in a range of 5 mass % or less relative to the total amount of the negative electrode active material particle(s), the battery capacity is prevented from lowering.

In the present invention, particularly, it is preferred that the sum of content of at least one kind of the salt selected from the salts of polyacrylic acid and the salts of carboxymethyl cellulose, the salt(s) being contained in the negative electrode active material particle, on the basis of mass be smaller than the sum of content of the metal salt containing at least one kind of metal selected from Mg and Al, the salt(s) being contained in the negative electrode active material particle, on the basis of mass. When the metal salt is contained in larger amount than the salt of polyacrylic acid and so on, the aqueous negative electrode slurry is more improved in stability.

In the present invention, the salt(s) of polyacrylic acid or the salt(s) of carboxymethyl cellulose may be at least one kind of salt selected from ammonium salts of carboxymethyl cellulose (CMC-$NH_4$), lithium salts of polyacrylic acid (PAA-Li), ammonium salts of polyacrylic acid (PAA-$NH_4$), etc. Among these salt(s) of polyacrylic acid and the salt(s) of carboxymethyl cellulose, ammonium salt(s) are particularly preferable. Because these salts allow the aqueous negative electrode slurry to be more improved in stability.

In the present invention, the metal salt containing at least one kind of metal selected from Mg and Al is preferably any of a nitrate, a phosphate, a chloride, or a sulfate. Since the aqueous negative electrode slurry is more improved in stability by containing these salts. More specifically, the metal salt containing at least one kind of metal selected from Mg and Al may be at least one metal salt selected from $Mg(NO_3)_2$, $MgCl_2$, $MgSO_4$, $Mg_3(PO_4)_2$, $AlCl_3$, $Al(NO_3)_3$, $AlPO_4$, etc.

It is preferred that the salt(s) of polyacrylic acid or the salt(s) of carboxymethyl cellulose, and the metallic salt(s) containing at least one kind of metal selected from Mg and Al be weak alkaline. Using a weak alkaline salt, Li silicate is less liable to elute Li compared to the case of using an acidic salt.

The silicon compound particle preferably has a diffraction peak attributable to Si(111) crystal face in which the half value width ($2\theta$) is 1.2° or more in an X-ray diffraction using Cu-K$\alpha$ ray, and the size of the crystallite corresponding to the crystal face is preferably 7.5 nm or less. This peak appears near $2\theta=28.4\pm0.5°$ when the crystallinity is high (when the half value width is narrow). In the silicon compound particle, the silicon compound is better when the silicon crystallinity is lower. In particular, when the content of Si crystal is smaller, it is possible to improve the battery capacity and to form a stable Li compound.

The inventive negative electrode active material is preferable that the silicon compound particle satisfy a relationship of A>B where A is a maximum peak intensity derived from Si and Li silicate region given in the chemical shift value of −60 to −95 ppm, and B is a peak intensity derived from $SiO_2$-region given in the chemical shift value of −96 to −150 ppm, each obtained from a $^{29}$Si-MAS-NMR spectrum. With the silicon compound particle in which the amount of silicon component or $Li_2SiO_3$ is relatively larger based on the $SiO_2$ component, it is possible to obtain sufficient effect for improving the battery properties by Li insertion. Incidentally, the conditions for measuring $^{29}$Si-MAS-NMR may be the same as those described above.

The negative electrode active material particle preferably has a median diameter ($D_{50}$: the particle diameter when the accumulated volume becomes 50%) of 3 μm or more and 15 μm or less. When the median diameter is in the above range, lithium ions are easily occluded and released in charging and discharging, and the particle becomes less liable to break. When the median diameter is 3 μm or more, it is possible to decrease the surface area per mass to prevent increase of the irreversible battery capacity. On the other hand, when the median diameter is 15 μm or less, the particle becomes less liable to break, thereby being prevented from forming a new surface.

In the inventive negative electrode active material, the negative electrode active material particle preferably has a surface layer portion containing a carbon material. The negative electrode active material particle is improved in electric conductivity by containing a carbon material in the surface layer portion. Accordingly, when the negative electrode active material containing the negative electrode active material particles like this is used as a negative electrode active material for a secondary battery, the battery properties are successfully improved.

The carbon material of the surface layer portion of the negative electrode active material particle preferably has an average thickness of 5 nm or more and 5000 nm or less. When the average thickness of the carbon material is 5 nm or more, the electric conductivity is improved. When the average thickness of the carbon material for covering is 5000 nm or less, it is possible to prevent lowering of the battery capacity in case of using a negative electrode active material containing the negative electrode active material particle like this as a negative electrode active material for a lithium ion secondary battery.

The average thickness of this carbon material can be calculated by the following procedure, for example. First, the negative electrode active material particles are observed through transmission electron microscope (TEM) at an optional magnification. This magnification is preferably a magnification by which the thickness of carbon material can be determined visually so as to measure the thickness. Subsequently, the thicknesses of carbon material are measured at 15 random points. In this case, it is preferable to set the measuring points widely and randomly as possible without focusing a particular place. Lastly, the average value of the thicknesses of carbon material at the 15 points are calculated.

The covering rate of carbon material is not particularly limited, but is desirable to be as high as possible. The covering rate of 30% or more improves the electric conductivity further, and is preferable. The method for covering the carbon material is not particularly limited, but a method of carbonizing saccharide and a pyrolysis method of hydrocarbon gas are preferable since they can improve the covering rate.

As the negative electrode binder contained in the negative electrode active material layer, any one or more of polymer material, synthetic rubber, and so on are usable, for example. Illustrative examples of the polymer material includes polyvinylidene fluoride, polyimide, polyamideimide, aramid, polyacrylic acid, lithium polyacrylate, and carboxymethyl cellulose. Illustrative examples of the synthetic rubber includes styrene-butadiene rubber, fluororubber, and ethylene-propylene-diene.

As the negative electrode conductive assistant agent, any one or more of a carbon material, such as carbon black, acetylene black, graphite, ketjen black, carbon nanotube, and carbon nanofiber can be used.

The negative electrode active material layer is formed by an application method, for example. The application method is a method in which a negative electrode active material particle is mixed with the above binder and so on, optionally with a conductive assistant agent or a carbon material, and then dispersed to organic solvent, water, or the like so as to be applied.

[Method of Producing Negative Electrode]

A negative electrode can be produced by the following procedures, for example. First, a method for producing a negative electrode active material used for a negative electrode will be described. In the beginning, a silicon compound particle containing a silicon compound ($SiO_x$: $0.5 \leq x \leq 1.6$) is produced. Then, Li is inserted into the silicon compound particle, thereby making the silicon compound particle contain a Li compound. In this way, a negative electrode active material particle is prepared. Subsequently, the prepared negative electrode active material particle is made to contain at least one kind of salt selected from salts of polyacrylic acid and salts of carboxymethyl cellulose, together with a metal salt containing at least one kind of metal selected from Mg and Al. Then, using this negative electrode active material particle, a negative electrode active material is produced.

More specifically, the negative electrode active material can be produced as follows. First, a raw material which generates silicon oxide gas is heated at a temperature range of 900° C. to 1600° C. in a reduced pressure under an inert gas atmosphere to generate silicon oxide gas. When considering the existence of oxygen on surface of the metallic silicon powder and slight oxygen in a reaction furnace, the mixing molar ratio is desirably in a range of 0.8<metallic silicon powder/silicon dioxide powder <1.3.

The generated silicon oxide gas is solidified and deposited on an absorbing plate. Subsequently, the deposit of silicon oxide is taken out under the condition of the temperature in the reaction furnace of 100° C. or below, and then the deposit is ground and powdered using a ball mil, a jet mil, or the like. Thus obtained powder may be classified. In the present invention, the distribution of particle size of the silicon compound particle can be controlled in the pulverization step and the classification step. As described above, the silicon compound particle can be produced. It is to be noted that the Si crystallite in the silicon compound particle can be controlled by altering the vaporization temperature or heat treatment after the formation.

On the surface layer of the silicon compound particle, a carbon material layer may be formed. As a method to form the carbon material layer, a thermal decomposition CVD method is desirable. Hereinafter, an example of the method for forming a carbon material layer by thermal decomposition CVD method will be described.

First, silicon compound particles are set in a furnace. Then, a hydrocarbon gas is introduced into the furnace, and the temperature in the furnace is raised. The pyrolysis temperature is preferably, but not particularly limited to, 1200° C. or less, more preferably 950° C. or less. When the pyrolysis temperature is 1200° C. or less, it is possible to prevent unintentional disproportionation of active material particles. After raising the furnace temperature to a prescribed temperature, a carbon layer is formed onto the surface of the silicon compound particle. The hydrocarbon gas to be a raw material of the carbon material is not particularly limited, but preferably has a composition of $C_nH_m$ where $n \le 3$. When $n \le 3$, it is possible to decrease the production cost and to improve the properties of the decomposition products.

Then, into the silicon active material particle produced as described above, Li is inserted, thereby bringing a Li compound to be contained. In this case, it is preferable to contain at least one of $Li_2Si_2O_5$, $Li_2SiO_3$, and $Li_4SiO_4$ as the Li compound. To obtain such Li silicate(s), the insertion of Li is preferably performed by an oxidation and reduction method.

In the modification by an oxidation and reduction method, lithium can be inserted by immersing silicon active material particles into solution-A in which lithium is dissolved into ether solvent, for example. This solution-A may also contain a polycyclic aromatic compound or a linear polyphenylene compound additionally. After inserting lithium, active lithium can be extracted from the silicon active material particles by immersing the silicon active material particles into solution-B that contains a polycyclic aromatic compound or its derivative. Illustrative examples of solvents usable for this solution-B include ether-based solvents, ketone-based solvents, ester-based solvents, alcohol-based solvents, amine-based solvents, and mixture thereof. The obtained silicon active material particles may be heat treated at 400 to 800° C. in an inert gas after being immersed to solution-A. The heat treatment allows the Li compound to be stable. This may be followed by washing with alcohol, alkaline water in which lithium carbonate is dissolved, weak acid, or pure water.

As the ether-based solvents used in the solution-A, diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, or mixed solvents thereof may be used. Among these, in particular, tetrahydrofuran, dioxane and 1,2-dimethoxy ethane may be preferably used. These solvents are preferable to be dewatered and preferable to be deoxygenized.

Further, as the polycyclic aromatic compound contained in the solution-A, one or more kinds of naphthalene, anthracene, phenanthrene, naphthacene, pentacene, pyrene, picene, triphenylene, coronene, chrysene, and derivatives thereof are usable, and, as the straight chain polyphenylene compound, one or more kinds of biphenyl, terphenyl, and derivatives thereof may be used.

As the polycyclic aromatic compound contained in the solution-B, one or more kinds of naphthalene, anthracene, phenanthrene, naphthacene, pentacene, pyrene, picene, triphenylene, coronene, chrysene, and derivatives thereof may be used.

Further, as the ether-based solvent of the solution-B, diethyl ether, tert-butyl methyl ether, tetrahydrofuran, dioxane, 1,2-dimethoxy ethane, diethylene glycol dimethyl ether, triethylene glycol dimethyl ether, and tetraethylene glycol dimethyl ether may be used.

As the ketone-based solvent, acetone, acetophenone or the like may be used.

As the ester-based solvent, methyl formate, methyl acetate, ethyl acetate, propyl acetate, and isopropyl acetate may be used.

As the alcohol-based solvent, methanol, ethanol, propanol, and isopropyl alcohol may be used.

As the amine-based solvent, methyl amine, ethyl amine, and ethylene diamine may be used.

Alternatively, the insertion of Li may be performed by a thermal doping method. In modification by thermal doping method, the silicon-based active material particle can be modified by mixing with LiH powder or Li powder, followed by heating in a non-oxidizing atmosphere. As the non-oxidizing atmosphere, an Ar atmosphere and so on are usable. More specifically, LiH powder or Li powder and silicon oxide particles are sufficiently mixed in an Ar atmosphere at first, followed by sealing and homogenizing by stirring the whole sealed container. Subsequently, this is heated in a range of 700° C. to 750° C. to be modified. In this case, for extracting Li from the silicon compound, the heated powder may be sufficiently cooled, and then washed with alcohol, alkaline water, weak acid, or pure water.

Incidentally, when the modification is performed by a thermal doping method, the $^{29}$Si-MAS-NMR spectrum obtained for the silicon compound particle is different from that in case of using an oxidation and reduction method. FIG. 2 shows an example of $^{29}$Si-MAS-NMR spectrum measured for the silicon compound particle when it is modified by oxidation and reduction method. In FIG. 2, the peak given near −75 ppm is a peak attributable to $Li_2SiO_3$, and the peak given in −80 to −100 ppm is a peak attributable to Si. Incidentally, there can be a peak of Li silicate other than $Li_2SiO_3$ and $Li_4SiO_4$ ranging from −80 to −100 ppm in some cases.

FIG. 3 shows an example of $^{29}$Si-MAS-NMR spectrum measured for the silicon compound particle when it is modified by thermal doping method. In FIG. 3, the peak given near −75 ppm is a peak attributable to $Li_2SiO_3$, and the peak given in −80 to −100 ppm is a peak attributable to Si. Incidentally, there can be a peak of Li silicate other than $Li_2SiO_3$ and $Li_4SiO_4$ ranging from −80 to −100 ppm in some cases. Incidentally, the peak of $Li_4SiO_4$ can be determined from the XPS spectrum.

Subsequently, the negative electrode active material particle is made to contain at least one kind of salt selected from salts of polyacrylic acid and salts of carboxymethyl cellulose, together with a metal salt containing at least one kind of metal selected from Mg and Al. The negative electrode active material particle can be doped with these salts by the following method.

For example, the following wet blending method can be used. In the wet blending method, the surface of the negative electrode active material particle is sprayed with a solution dispersing at least one kind of the salt selected from salts of polyacrylic acid and salts of carboxymethyl cellulose as well as the metal salt containing at least one kind of metal selected from Mg and Al, and the negative electrode active material particle is dried after spraying, whereby the surface of the negative electrode active material particle is allowed to contain the salts described above.

More specifically, the negative electrode active material particle may be sprayed with aqueous solution in which polyacrylate salt and aluminum phosphate have been dispersed in water, for example, followed by drying the negative electrode active material particle. In aqueous solvent, polyacrylate salt is dissolved, but aluminum phosphate is not dissolved. Accordingly, exchange of cations or anions hardly occurs between these salts in the aqueous solvent. Therefore, the concentration of each salt can be controlled in the negative electrode active material particle by adjusting the mass of each salt when they are dispersed into solvent in accordance with the mass of the negative electrode active material particle. Alternatively, the negative electrode active material particle may be sprayed with organic solvents, such as ethanol, dispersing the salt of carboxymethyl cellulose and the metal salt, followed by drying the negative electrode active material particle.

Other than the wet blending method described above, a dry blending method may be used. In this case, the negative electrode active material particle, at least one kind of the salt selected from salts of polyacrylic acid and salts of carboxymethyl cellulose, and the metal salt containing at least one kind of metal selected from Mg and Al are dry blended using known processing apparatus (e.g., NOBILTA® NOB/HOSOKAWA MICRON CORPORATION, NAUTA MIXER® DBX/HOSOKAWA MICRON CORPORATION), whereby allowing each salt to attach onto the surface of the negative electrode active material particle.

The negative electrode active material produced as described above is mixed with other materials such as a negative electrode binder and a conductive assistant agent to form a negative-electrode mixture. Then, organic solvent or water is added thereto to form slurry. Subsequently, the slurry is applied onto the surface of a negative electrode collector and dried to form a negative electrode active material layer. In this case, heat pressing and so on may be performed in accordance with needs. As described above, a negative electrode is successfully produced.

<Lithium-Ion Secondary Battery>

Then, a lithium-ion secondary battery containing the inventive negative electrode active material will be described. Here exemplifies a lithium-ion secondary battery of a laminate film type as a concrete example.

[Configuration of Laminate Film Type Lithium-Ion Secondary Battery]

The laminate film type lithium-ion secondary battery 20 shown in FIG. 4 mainly includes a wound electrode body 21 stored in sheet-shaped outer parts 25. This wound body is formed by winding a positive electrode, a negative electrode, and a separator disposed between these electrodes.

There is also a case storing a laminate having a separator disposed between a positive electrode and a negative electrode. The electrode bodies of both types have a positive-electrode lead 22 attached to the positive electrode and a negative-electrode lead 23 attached to the negative electrode. The outermost circumference of the electrode bodies is protected by a protecting tape.

The positive-electrode lead and the negative-electrode lead, for example, extends from the interior of the outer parts 25 toward the exterior in one direction. The positive-electrode lead 22 is made of, for example, a conductive material such as aluminum; the negative-electrode lead 23 is made of, for example, a conductive material such as nickel or copper.

An example of the outer part 25 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 21. The fusion-bond layer may be, for example, a film such as a polyethylene or polypropylene film; the metallic layer may be aluminum foil, for example; the protecting layer may be nylon, for example.

The space between the outer parts 25 and the positive and negative electrode leads is filled with close adhesion films 24 to prevent air from entering therein. Exemplary materials of the close adhesion films include polyethylene, polypropylene, and polyolefin resins.

[Positive Electrode]

The positive electrode has a positive electrode active material layer disposed on one side or both sides of a positive electrode current collector as in the negative electrode 10 shown in FIG. 1, for example.

The positive electrode current collector is made of, for example, a conductive material such as aluminum.

The positive electrode active material layer contains any one kind or two kinds of positive electrode materials capable of occluding and releasing lithium ions, and may contain a binder, a conductive assistant agent, a dispersing agent, or other materials according to design. The same detailed description as described for the negative electrode binders and negative electrode conductive assistant agent, for example, is then given for the binder and the conductive assistant agent.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xM1O_2$ or $Li_yM2PO_4$, where M1 and M2 represent at least one kind of transition metal elements, and "x" and "y" represent a value varied depending on a charging or discharging status of a battery, which typically satisfy $0.05 \leq x \leq 1.10$ and $0.05 \leq y \leq 1.10$.

Examples of the complex oxide composed of lithium and a transition metal element include a lithium cobalt complex oxide ($Li_xCoO_2$) and a lithium nickel complex oxide ($Li_xNiO_2$). Examples of the phosphate compound containing lithium and a transition metal element include a lithium iron phosphate compound ($LiFePO_4$), a lithium iron manganese phosphate compound ($LiFe_{1-u}Mn_uPO_4$ ($0<u<1$)). This is because higher battery capacity and excellent cycle performance are obtained using the positive electrode materials described above.

[Negative Electrode]

The negative electrode has a configuration similar to that of the above negative electrode 10 for a lithium ion secondary battery shown in FIG. 1, and, for example, has the negative electrode active material layers 12 disposed on both faces of the current collector 11. The negative electrode preferably has a negative-electrode charge capacity larger than electrical capacitance (a battery charge capacity) provided by the positive electrode active material, for this negative electrode itself can inhibit the precipitation of lithium metal.

The positive electrode active material layer is formed partially on both faces of the positive electrode current collector. The negative electrode active material layer is also formed partially on both faces of the negative electrode current collector. In this case, the negative electrode active material layer provided on the negative electrode current collector, for example, has a region which does not corresponds to a positive electrode active material layer to be faced. This intends to perform a stabilized battery design.

A non-facing area, that is, the above area at which the positive and negative electrode active material layers do not face one another is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolytic Solution]

At least a part of the active material layers or the separator is impregnated with a liquid electrolyte (an electrolytic solution). This electrolytic solution is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran. Among these, ethylene carbonate, propylene carbonate, dimethyl carbonate, diethyl carbonate, or ethylmethyl carbonate, or the combination thereof is preferable. Such solvent enables better performances. In this case, the dissociation of electrolyte salt and ionic mobility can be improved by combined use of a viscous solvent, such as ethylene carbonate or propylene carbonate, and a non-viscous solvent, such as dimethyl carbonate, ethylmethyl carbonate, or diethyl carbonate.

For an alloyed negative electrode, the solvent preferably contains at least one of halogenated chain carbonate ester and halogenated cyclic carbonate ester. Such a solvent enables the negative electrode active material to be coated with a stable coating at discharging and particularly charging. The halogenated chain carbonate ester is chain carbonate ester having halogen as a constituent element (at least one hydrogen is substituted by halogen). And the halogenated cyclic carbonate ester is cyclic carbonate ester having halogen as a constituent element (that is, at least one hydrogen is substituted by halogen).

The halogen is preferably, but not limited to, fluorine, for fluorine enables the formation of better coating than other halogens do. A larger number of halogens is better, for a more stable coating can be obtained which reduces a decomposition reaction of an electrolytic solution.

Examples of the halogenated chain carbonate ester include fluoromethyl methyl carbonate, difluoromethyl methyl carbonate. Examples of the halogenated cyclic carbonate ester include 4-fluoro-1,3-dioxolane-2-one, 4,5-difluoro-1,3-dioxolane-2-one.

The solvent preferably contains an unsaturated carbon bond cyclic carbonate ester as an additive, for this enables the formation of a stable coating on a negative electrode at charging and discharging and the inhibition of a decomposition reaction of the electrolyte. Examples of the unsaturated carbon bond cyclic carbonate ester include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolytic solution. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent is preferably 0.5 mol/kg or more and 2.5 mol/kg or less. This content enables high ionic conductivity.

[Method of Producing Laminate Film Type Secondary Battery]

The present invention makes it possible to produce a negative electrode using a negative electrode active material produced by the inventive method of producing a negative electrode active material described above, and to produce a lithium-ion secondary battery using the produced negative electrode.

Firstly, a positive electrode is produced with the above positive electrode material. A positive electrode mixture is created by mixing the positive electrode active material with as necessary the binder, the conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the heating or the compression may be repeated multiple times.

Secondly, a negative electrode active material layer is formed on a negative electrode current collector to produce a negative electrode through the same procedure as in the above production of the negative electrode 10 for a lithium ion secondary battery.

In producing the positive electrode and the negative electrode, the active material layers are formed on both faces of the positive and negative electrode current collector. In both the electrodes, the length of these active material layers formed on the faces may differ from one another (See FIG. 1).

Then, an electrolytic solution is prepared. With ultrasonic welding, the positive electrode lead 22 is attached to the positive electrode current collector and the negative-electrode lead 23 is attached to the negative electrode current collector. The positive and negative electrodes and the separator interposed therebetween are stacked or wound to produce the wound electrode body 21 and a protecting tape is stuck to the outermost circumference of the body. The electrode body is flattened. The film-shaped outer part 25 is folded in half to interpose the electrode body therebetween. The insulating portions of the outer part are stuck to one another by heat sealing, thereby the wound electrode body is encapsulated with one direction is released. The close adhesion films are inserted between the outer part and the positive and negative electrode leads. The prepared electrolytic solution is introduced from the released side in a prescribed amount to perform the impregnation of the electrolytic solution under a vacuum. The released side is stuck by vacuum heat sealing. In this manner, the laminate film type lithium-ion secondary battery 20 is successfully produced.

EXAMPLE

Hereinafter, the present invention will be more specifically described by showing Examples of the present invention and Comparative Examples, but the present invention is not limited to these Examples.

Example 1-1

The laminate film type lithium ion secondary battery 20 shown in FIG. 4 was produced by the following procedure.

The procedure began with the production of a positive electrode. A positive-electrode mixture was prepared by mixing 95 mass % of $LiNi_{0.7}Co_{0.25}Al_{0.05}O$ of lithium-nickel-cobalt complex oxide as a positive electrode active material, 2.5 mass % of a positive electrode conductive assistant agent, and 2.5 mass % of a positive electrode binder (polyvinylidene fluoride: PVDF). The positive-electrode mixture was dispersed in an organic solvent (N-methyl-2-pyrrolidone, NMP) to form paste slurry. The slurry was applied to both surfaces of a positive electrode current collector with a coating apparatus having a die head and dried with a drying apparatus of hot-air type. The positive electrode current collector used herein had a thickness of 15 µm. The resultant was finally compressed with a roll press.

Next, a negative electrode was produced. In the beginning, a negative electrode active material was produced by the following procedure. A mixed raw material of metallic silicon and silicon dioxide was introduced into a reaction furnace and evaporated under a vacuum atmosphere of 10 Pa to deposit the evaporated material on an adsorption plate. The deposit was sufficiently cooled and then taken out to pulverize the deposit with a ball mill. In thus obtained silicon compound particle, the value of "x" in $SiO_x$ was 0.5. The silicon compound particles were classified to adjust the particle sizes. Then, thermal decomposition CVD was performed to coat the silicon compound particles with carbon material.

Subsequently, the silicon compound particle coated with carbon coating (negative electrode active material particle) was modified through lithium insertion by an oxidation and reduction method. First, negative electrode active material particles were immersed into a solution (Solution C) in which lithium pieces and naphthalene of aromatic compound had been dissolved to tetrahydrofuran (hereinafter, referred to as THF). This solution C was prepared by dissolving naphthalene to THF solvent in a concentration of 0.2 mol/L, followed by adding lithium pieces in a mass of 10 mass % relative to this mixture solution of THF and naphthalene. In immersion of the negative electrode active material particles, the temperature of the solvent was set to 20° C., and the immersion period was set to 20 hours. Then, the negative electrode active material particles were filtered off. By the above treatments, lithium was inserted into the negative electrode active material particles.

Then, the obtained silicon compound particles were subjected to heat treatment at 600° C. for 24 hours in an argon atmosphere to stabilize the Li compound.

Next, the negative electrode active material particles were sprayed with ethanol in which ammonium salt of carboxymethyl cellulose ($CMC-NH_4$) and aluminum phosphate ($AlPO_4$) had been dispersed, and the negative electrode active material particles were dried. The negative electrode active material particles had a $CMC-NH_4$ content of 1 mass % and a $AlPO_4$ content of 2 mass %.

Subsequently, the negative electrode active material particles for producing a negative electrode (silicon-based negative electrode active material) and a carbon-based active material were blended in a mass ratio of 2:8 to produce a negative electrode active material. The carbon-based active material used herein was a mixture in which artificial graphite and natural graphite coated with a pitch layer was mixed in a mass ratio of 5:5. The carbon-based active material had a median diameter of 20 µm.

Then, the produced negative electrode active material, conductive assistant agent-1 (carbon nanotube, CNT), conductive assistant agent-2 (carbon fine particle with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. This was diluted with pure water to form negative-electrode mixture slurry. Incidentally, the foregoing SBR and CMC were negative electrode binders (negative electrode binding agents).

To evaluate the stability of aqueous slurry containing the negative electrode active material particles, 30 g of a part of the produced negative-electrode mixture slurry was taken out separately from those for producing a secondary battery, stored at 20° C., and measured for times till gas generation from production of the negative-electrode mixture slurry.

As the negative electrode current collector, an electrolytic copper foil with a thickness of 15 µm was used. This electrolytic copper foil contained each 70 ppm by mass of carbon and sulfur. Finally, the negative electrode mixture slurry was applied onto the negative electrode current collector, and subjected to drying at 100° C. for 1 hour under a vacuum. The negative electrode active material layer had a deposited amount of 5 mg/cm² per unit area on a face of the negative electrode after drying (also referred to as an area density).

Subsequently, solvents (4-fluoro-1,3-dioxolane-2-one (FEC), ethylene carbonate (EC), and dimethyl carbonate (DMC)) were mixed, followed by dissolving electrolyte salt (lithium hexafluorophosphate ($LiPF_6$)) to prepare an electrolytic solution. In this case, the solvent composition was set to FEC:EC:DMC=10:20:70 in a volume ratio, and the content of the electrolyte salt was set to 1.2 mol/kg based on the solvent.

Then, a secondary battery was assembled as follows. First, an aluminum lead was attached to one end of the positive electrode current collector with ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding was fixed with a PET protecting tape. The separator used herein was a laminate film (thickness: 12 μm) in which a film mainly composed of porous polyethylene was sandwiched by films mainly composed of porous polypropylene. Then, the electrode body was put between outer parts, and then peripheries excluding one side are hot melted, and thereby the electrode body was stored in the outer parts. The outer part was an aluminum laminate film in which a nylon film, an aluminum foil, and a polypropylene film were laminated. Then, the electrolytic solution was introduced from the open side to perform the impregnation under a vacuum. The open side was then stuck by heat sealing.

On the secondary battery thus produced, the cycle performance and the first charge-discharge characteristics were evaluated.

The cycle performance was investigated in the following manner: First, two cycles of charging and discharging were performed at 0.2 C under an atmosphere of 25° C. to stabilize the battery and the discharge capacity in the second cycle was measured. Next, the cycle of charging and discharging was repeated until the total number of cycles reached 499 cycles and the discharge capacity was measured every cycle. Finally, a capacity retention rate (hereinafter, referred to as a retention rate simply) was calculated by dividing the discharge capacity in the 500-th cycle, which was obtained by charging and discharging at 0.2 C, by the discharge capacity in the second cycle. In the normal cycle, that is, in the cycles from the third cycle to 499-th cycle, the charging and discharging were performed at 0.7 C in charging and 0.5 C at discharging.

To investigate the first charge-discharge characteristics, a first efficiency (hereinafter, also referred to as an initial efficiency) was calculated. The first efficiency was calculated from the expression shown by First Efficiency (%)= (First Discharge Capacity/First Charge Capacity)×100. The atmosphere temperate was the same as the cycle performance was investigated.

Examples 1-2 to 1-3, Comparative Examples 1-1 and 1-2

A secondary battery was produced as in Example 1-1 except for adjusting the oxygen amount in the bulk of the silicon compound. In this case, the oxygen amount was adjusted by changing the ratio of metallic silicon and silicon oxide in the raw material of silicon compound or heating temperature. Each "x" value of the silicon compound shown by $SiO_x$ in Examples 1-1 to 1-3 and Comparative Examples 1-1 to 1-2 is shown in Table 1.

In this case, the silicon-based active material particles in Examples 1-1 to 1-3 and Comparative Examples 1-1 to 1-2 had properties as described below. The silicon-based active material particles in the negative electrode active material particles had a median diameter of 8 μm. In the interior of silicon compound particles, $Li_2Si_2O_5$ and $Li_2SiO_3$ were contained. The silicon compound had a diffraction peak attributable to Si(111) crystal face in an X-ray diffraction, the half value width (2θ) of which was 2.257°, and the crystallite corresponding to the Si(111) crystal face with the size being 3.77 nm. The surface was coated with a carbon material having an average thickness of 50 nm.

In each of the Examples and Comparative Examples described above, the $^{29}Si$-MAS-NMR spectrum exhibited a peak attributable to Si and Li silicate region given in the chemical shift value of −60 to −95 ppm. In each of the Examples and Comparative Examples described above, the $^{29}Si$-MAS-NMR spectrum exhibited a relationship of A>B where A is a maximum peak intensity derived from Si and Li silicate region given in the chemical shift value of −60 to −95 ppm, and B is a peak intensity derived from $SiO_2$-region given in the chemical shift value of −96 to −150 ppm.

Table 1 shows evaluation results of Examples 1-1 to 1-3 and Comparative Examples 1-1 to 1-2.

TABLE 1

SiOx: $D_{50}$ = 8 μm; Graphite (natural graphite:artificial graphite = 5:5): $D_{50}$ = 20 μm; SiOx ratio 20 mass %; $Li_2Si_2O_5$, $Li_2SiO_3$; carbon material: average thickness 50 nm; half value width 2.257°, crystallite 3.77 nm; modification method: oxidation and reduction method; A > B; CMC-$NH_4$ content: 1 mass %, $AlPO_4$ content: 2 mass %, wet blending method

| Table 1 | x | Capacity retention rate (%) | Initial efficiency (%) | Times till gas generation |
|---|---|---|---|---|
| Comparative Example 1-1 | 0.3 | 49 | 89.3 | 1 day |
| Example 1-1 | 0.5 | 65 | 88.1 | 2 days |
| Example 1-2 | 1 | 68 | 87.3 | 3 days |
| Example 1-3 | 1.6 | 70 | 87.2 | 3 days |
| Comparative Example 1-2 | 1.8 | — | — | — |

As shown in Table 1, when the value of "x" was out of the range of 0.5≤x≤1.6 in the silicon compound shown by $SiO_x$, the battery properties were lowered. For example, when the oxygen is insufficient (x=0.3) as shown in Comparative Example 1-1, the capacity retention rate was seriously lowered although the first efficiency was improved. On the other hand, as shown in Comparative Example 1-2, larger oxygen amount (x=1.8) caused lowering of the electric conductivity to fail to exhibit capacity of the silicon oxide substantially, and the evaluation was stopped thereby. In Examples 1-1 to 1-3, the times till gas generation were 2 days or more, showing that each stability of the aqueous negative electrode slurry was higher. Incidentally, the measurement of times till gas generation was omitted in Comparative Example 1-2.

Examples 2-1 to 2-2

A secondary battery was produced under the same conditions as in Example 1-2 except for changing the kind of lithium silicate contained in the interior of the silicon compound particles as shown in Table 2, and the cycle performance, the first efficiency, and the stability of the aqueous negative electrode slurry were evaluated.

Comparative Example 2-1

A secondary battery was produced under the same conditions as in Example 1-2 except that Li was not inserted into the silicon compound particles, and the cycle performance, the first efficiency, and the stability of the aqueous negative electrode slurry were evaluated.

Table 2 shows the results of Examples 2-1 to 2-2 and Comparative Example 2-1.

TABLE 2

SiOx: x = 1, $D_{50}$ = 8 μm; Graphite (natural graphite:artificial graphite = 5:5): $D_{50}$ = 20 μm; SiOx ratio 20 mass %; carbon material: average thickness 50 nm; half value width 2.257°, crystallite 3.77 nm; modification method: oxidation and reduction method; A > B; CMC-NH$_4$ content: 1 mass %, AlPO$_4$ content: 2 mass %, wet blending method

| Table 2 | Lithium silicate | Capacity retention rate (%) | Initial efficiency (%) | Times till gas generation |
|---|---|---|---|---|
| Example 2-1 | Li$_2$Si$_2$O$_5$ | 69 | 87.5 | 4 days |
| Example 2-2 | Li$_4$SiO$_4$, Li$_2$SiO$_3$ | 73 | 87.1 | 1 day |
| Example 1-2 | Li$_2$Si$_2$O$_5$, Li$_2$SiO$_3$ | 70 | 87.3 | 3 days |
| Comparative Example 2-1 | — | 72 | 78.2 | None |

When the silicon compound particles contained stable lithium silicate, such as Li$_2$SiO$_3$ and Li$_4$SiO$_4$, the capacity retention rate and the initial efficiency were improved proportionally. In particular, when two kinds of lithium silicates were contained, the capacity retention rate and the initial efficiency were improved more proportionally. In Examples 1-2, 2-1, and 2-2, the times till gas generation became 1 day or more, that is, the aqueous negative electrode slurry achieved sufficient stability. On the other hand, when the silicon compound particles did not contained a Li compound as in Comparative Example 2-1, the initial efficiency was seriously lowered although gas generation was prevented.

Examples 3-1 to 3-38

A secondary battery was produced under the same conditions as in Example 1-2 except for changing the content of the salt of carboxymethyl cellulose (CMC salt), the kind of metal salt, and the content of the metal salt as shown in Table 3, and the cycle performance, the first efficiency, and the stability of the aqueous negative electrode slurry were evaluated.

Table 3 shows the results of Examples 3-1 to 3-38.

TABLE 3

SiOx: x = 1, $D_{50}$ = 8 μm; Graphite (natural graphite:artificial graphite = 5:5): $D_{50}$ = 20 μm; SiOx ratio 20 mass %; Li$_2$Si$_2$O$_5$, Li$_2$SiO$_3$; carbon material: average thickness 50 nm; half value width 2.257°, crystallite 3.77 nm; modification method: oxidation and reduction method; A > B, wet blending method

| | CMC salt | CMC salt content (mass %) | Metal salt | Metal salt content (mass %) | Capacity retention rate (%) | Initial efficiency (%) | Times till gas generation |
|---|---|---|---|---|---|---|---|
| Example 3-1 | CMC-NH$_4$ | 1 | Mg(NO$_3$)$_2$ | 2 | 71 | 87.1 | 2 days |
| Example 3-2 | CMC-NH$_4$ | 1 | Mg$_3$(PO$_4$)$_2$ | 2 | 70 | 87.3 | 3 days |
| Example 3-3 | CMC-NH$_4$ | 1 | AlCl$_3$ | 2 | 68 | 87 | 2 days |
| Example 3-4 | CMC-NH$_4$ | 1 | Al(NO$_3$)$_3$ | 2 | 70 | 87.1 | 3 days |
| Example 1-2 | CMC-NH$_4$ | 1 | AlPO$_4$ | 2 | 70 | 87.3 | 3 days |
| Example 3-5 | CMC-NH$_4$ | 1 | Mg(NO$_3$)$_2$ | 1 | 71 | 87 | 1 day |
| Example 3-6 | CMC-NH$_4$ | 1 | Mg$_3$(PO$_4$)$_2$ | 1 | 70 | 87.3 | 2 days |
| Example 3-7 | CMC-NH$_4$ | 1 | AlCl$_3$ | 1 | 69 | 87 | 1 day |
| Example 3-8 | CMC-NH$_4$ | 1 | Al(NO$_3$)$_3$ | 1 | 71 | 87.1 | 2 days |
| Example 3-9 | CMC-NH$_4$ | 1 | AlPO$_4$ | 1 | 69 | 87.2 | 2 days |
| Example 3-10 | CMC-NH$_4$ | 1 | Mg(NO$_3$)$_2$ | 0.5 | 71 | 87.1 | 13 hours |
| Example 3-11 | CMC-NH$_4$ | 1 | Mg$_3$(PO$_4$)$_2$ | 0.5 | 69 | 87.3 | 22 hours |
| Example 3-12 | CMC-NH$_4$ | 1 | AlCl$_3$ | 0.5 | 68 | 87.2 | 14 hours |
| Example 3-13 | CMC-NH$_4$ | 1 | Al(NO$_3$)$_3$ | 0.5 | 69 | 87.1 | 21 hours |
| Example 3-14 | CMC-NH$_4$ | 1 | AlPO$_4$ | 0.5 | 70 | 87 | 21 hours |
| Example 3-15 | CMC-NH$_4$ | 0.1 | Mg(NO$_3$)$_2$ | 2 | 69 | 87.3 | 1 day |
| Example 3-16 | CMC-NH$_4$ | 0.1 | Mg$_3$(PO$_4$)$_2$ | 2 | 68 | 87.3 | 1 day |
| Example 3-17 | CMC-NH$_4$ | 0.1 | AlCl$_3$ | 2 | 67 | 87.2 | 1 day |
| Example 3-18 | CMC-NH$_4$ | 0.1 | AlPO$_4$ | 2 | 69 | 87.1 | 1 day |
| Example 3-19 | CMC-NH$_4$ | 0.5 | Mg(NO$_3$)$_2$ | 2 | 71 | 87 | 2 days |
| Example 3-20 | CMC-NH$_4$ | 0.5 | Mg$_3$(PO$_4$)$_2$ | 2 | 70 | 87.2 | 2 days |
| Example 3-21 | CMC-NH$_4$ | 0.5 | AlCl$_3$ | 2 | 68 | 87.2 | 2 days |
| Example 3-22 | CMC-NH$_4$ | 0.5 | AlPO$_4$ | 2 | 69 | 87.1 | 2 days |
| Example 3-23 | CMC-NH$_4$ | 2 | Mg(NO$_3$)$_2$ | 3 | 69 | 87.3 | 2 days |
| Example 3-24 | CMC-NH$_4$ | 2 | Mg$_3$(PO$_4$)$_2$ | 3 | 68 | 87.1 | 2 days |
| Example 3-25 | CMC-NH$_4$ | 2 | AlCl$_3$ | 3 | 68 | 87.2 | 2 days |

TABLE 3-continued

SiOx: x = 1, $D_{50}$ = 8 μm; Graphite (natural graphite:artificial graphite = 5:5): $D_{50}$ = 20 μm; SiOx ratio 20 mass %; $Li_2Si_2O_5$, $Li_2SiO_3$; carbon material: average thickness 50 nm; half value width 2.257°, crystallite 3.77 nm; modification method: oxidation and reduction method; A > B, wet blending method

| | CMC salt | CMC salt content (mass %) | Metal salt | Metal salt content (mass %) | Capacity retention rate (%) | Initial efficiency (%) | Times till gas generation |
|---|---|---|---|---|---|---|---|
| Example 3-26 | CMC-NH$_4$ | 2 | AlPO$_4$ | 3 | 69 | 87.3 | 3 days |
| Example 3-27 | CMC-NH$_4$ | 5 | Mg(NO$_3$)$_2$ | 5 | 70 | 87.2 | 2 days |
| Example 3-28 | CMC-NH$_4$ | 5 | Mg$_3$(PO$_4$)$_2$ | 5 | 71 | 87.1 | 3 days |
| Example 3-29 | CMC-NH$_4$ | 5 | AlCl$_3$ | 5 | 71 | 87 | 2 days |
| Example 3-30 | CMC-NH$_4$ | 5 | AlPO$_4$ | 5 | 70 | 87.1 | 3 days |
| Example 3-31 | CMC-NH$_4$ | 0.1 | Mg(NO$_3$)$_2$ | 0.1 | 68 | 87.1 | 15 hours |
| Example 3-32 | CMC-NH$_4$ | 0.1 | Mg$_3$(PO$_4$)$_2$ | 0.1 | 69 | 87 | 16 hours |
| Example 3-33 | CMC-NH$_4$ | 0.1 | AlCl$_3$ | 0.1 | 71 | 87.2 | 16 hours |
| Example 3-34 | CMC-NH$_4$ | 0.1 | AlPO$_4$ | 0.1 | 70 | 87.3 | 15 hours |
| Example 3-35 | CMC-NH$_4$ | 0.1 | Mg(NO$_3$)$_2$ | 0.5 | 70 | 87.2 | 1 day |
| Example 3-36 | CMC-NH$_4$ | 0.1 | Mg$_3$(PO$_4$)$_2$ | 0.5 | 70 | 87.1 | 21 hours |
| Example 3-37 | CMC-NH$_4$ | 0.1 | AlCl$_3$ | 0.5 | 70 | 87.1 | 1 day |
| Example 3-38 | CMC-NH$_4$ | 0.1 | AlPO$_4$ | 0.5 | 71 | 87 | 1 day |

As can be seen from Table 3, when both of the salt of carboxymethyl cellulose and the metal salt containing Mg or Al were contained in a negative electrode active material particle, the times till gas generation were increased and the aqueous negative electrode slurry was improved in stability. When each content of the salt of carboxymethyl cellulose and the metal salt containing Mg or Al was 0.1 mass % or more, the aqueous negative electrode slurry exhibited sufficient stability. The times till gas generation were more increased in Examples 3-1 to 3-4, 3-15 to 3-26, and 3-35 to 3-38, having content of the metal salt larger than the content of the salt of carboxymethyl cellulose, than in Examples 3-10 to 3-14, having content of the metal salt smaller than the content of the salt of carboxymethyl cellulose.

Examples 3-39 to 3-43

A secondary battery was produced under the same conditions as in Example 1-2 except for changing the carboxymethyl cellulose to a salt of polyacrylic acid (PAA salt), together with changing the kind of metal salt and the content of the metal salt as shown in Table 4, and the cycle performance, the first efficiency, and the stability of the aqueous negative electrode slurry were evaluated.

Table 4 shows the results of Examples 3-39 to 3-43. Incidentally, "PAA-NH$_4$" in the Table means an ammonium salt of polyacrylic acid.

times till gas generation were increased and the aqueous negative electrode slurry was improved in stability as in the case of using a salt of carboxymethyl cellulose.

Comparative Example 3-1

A secondary battery was produced under the same conditions as in Example 1-2 except that the negative electrode active material particle contained none of the salts of the salt of polyacrylic acid, the salt of carboxymethyl cellulose, the metal salt containing Mg, and the metal salt containing Al after modifying the negative electrode active material particle, and the cycle performance, the first efficiency, and the stability of the aqueous negative electrode slurry were evaluated.

Comparative Examples 3-2 to 3-7

A secondary battery was produced under the same conditions as in Example 1-2 except that the negative electrode active material particle contained only a salt of polyacrylic acid or a salt of carboxymethyl cellulose without containing a metal salt after modifying the negative electrode active

TABLE 4

SiOx: x = 1, $D_{50}$ = 8 μm; Graphite (natural graphite:artificial graphite = 5:5): $D_{50}$ = 20 μm; SiOx ratio 20 mass %; $Li_2Si_2O_5$, $Li_2SiO_3$; carbon material: average thickness 50 nm; half value width 2.257°, crystallite 3.77 nm; modification method: oxidation and reduction method; A > B, wet blending method

| | PAA salt | PAA salt content (mass %) | Metal salt | Metal salt content (mass %) | Capacity retention rate (%) | Initial efficiency (%) | Times till gas generation |
|---|---|---|---|---|---|---|---|
| Example 3-39 | PAA-NH$_4$ | 1 | Mg(NO$_3$)$_2$ | 2 | 70 | 72 | 2 days |
| Example 3-40 | PAA-NH$_4$ | 1 | Mg$_3$(PO$_4$)$_2$ | 2 | 69 | 87 | 2 days |
| Example 3-41 | PAA-NH$_4$ | 1 | AlCl$_3$ | 2 | 71 | 87.1 | 2 days |
| Example 3-42 | PAA-NH$_4$ | 1 | Al(NO$_3$)$_3$ | 2 | 70 | 87.2 | 2 days |
| Example 3-43 | PAA-NH$_4$ | 1 | AlPO$_4$ | 2 | 71 | 87.1 | 2 days |

As can be seen from Table 4, when both of the salt of polyacrylic acid and the metal salt containing Mg or Al were contained in a negative electrode active material particle, the material particle, and the cycle performance, the first efficiency, and the stability of the aqueous negative electrode slurry were evaluated.

Comparative Examples 3-8 to 3-14

A secondary battery was produced under the same conditions as in Example 1-2 except that the negative electrode active material particle contained only a metal salt without containing a salt of polyacrylic acid or a salt of carboxymethyl cellulose after modifying the negative electrode active material particle, and the cycle performance, the first efficiency, and the stability of the aqueous negative electrode slurry were evaluated.

Table 5 shows the results of Comparative Examples 3-1 to 3-14. Incidentally, "PAA-Li" in Table 5 means a lithium salt of polyacrylic acid.

Example 4-1

A secondary battery was produced by the same procedure as in Example 1-2 except for changing the wet blending method to a dry blending method using NOBILTA® NOB of HOSOKAWA MICRON CORPORATION as the method of making the negative electrode active material particle contain a salt of polyacrylic acid or a salt of carboxymethyl cellulose and a metal salt, and the cycle performance, the first efficiency, and the stability of the aqueous negative electrode slurry were evaluated. Specifically, 1 g of CMC-$NH_4$ and 2 g of $AlPO_4$ were added to 100 g of the negative electrode active material particle, and they were subjected to treatment using NOBILTA (NOBILTA treatment) for 30 seconds.

TABLE 5

SiOx: x = 1, $D_{50}$ = 8 μm; Graphite (natural graphite:artificial graphite = 5:5): $D_{50}$ = 20 μm; SiOx ratio 20 mass %; $Li_2Si_2O_5$, $Li_2SiO_3$; carbon material: average thickness 50 nm; half value width 2.257°, crystallite 3.77 nm; modification method: oxidation and reduction method; A > B, wet blending method

| | PAA salt or CMC salt | PAA salt or CMC salt content (mass %) | Metal salt | Metal salt content (mass %) | Capacity retention rate (%) | Initial efficiency (%) | Times till gas generation |
|---|---|---|---|---|---|---|---|
| Comparative Example 3-1 | — | — | — | — | 69 | 87.1 | 3 hours |
| Comparative Example 3-2 | PAA-Li | 1 | — | — | 68 | 87 | 3 hours |
| Comparative Example 3-3 | PAA-$NH_4$ | 1 | — | — | 67 | 87.2 | 3 hours |
| Comparative Example 3-4 | PAA-Li | 2 | — | — | 69 | 87.1 | 3 hours |
| Comparative Example 3-5 | PAA-$NH_4$ | 2 | — | — | 69 | 87 | 3 hours |
| Comparative Example 3-6 | CMC-$NH_4$ | 1 | — | — | 68 | 87 | 3 hours |
| Comparative Example 3-7 | CMC-$NH_4$ | 2 | — | — | 67 | 87.3 | 3 hours |
| Comparative Example 3-8 | — | — | $Mg(NO_3)_2$ | 2 | 69 | 87 | 6 hours |
| Comparative Example 3-9 | — | — | $MgCl_2$ | 2 | 68 | 87.1 | 6 hours |
| Comparative Example 3-10 | — | — | $MgSO_4$ | 2 | 67 | 87.2 | 6 hours |
| Comparative Example 3-11 | — | — | $Mg_3(PO_4)_2$ | 2 | 70 | 87.1 | 6 hours |
| Comparative Example 3-12 | — | — | $AlCl_3$ | 2 | 70 | 87.2 | 8 hours |
| Comparative Example 3-13 | — | — | $Al(NO_3)_3$ | 2 | 69 | 87.1 | 9 hours |
| Comparative Example 3-14 | — | — | $AlPO_4$ | 2 | 69 | 87.1 | 8 hours |

As can be seen from Comparative Examples 3-2 to 3-7, when the negative electrode active material particle contained only a salt of polyacrylic acid or a salt of carboxymethyl cellulose, the times till gas generation were equal to that in Comparative Example 3-1, failing to obtain an effect of improving stability of slurry. When the negative electrode active material particle contained only a metal salt, the times till gas generation were increased than those in Comparative Examples 3-1 to 3-7, but inferior to those in Examples shown in Tables 3 and 4.

Example 4-2

A secondary battery was produced by the same procedure as in Example 1-2 except for changing the wet blending method to a dry blending method using NAUTA MIXER® DBX of HOSOKAWA MICRON CORPORATION as the method of making the negative electrode active material particle contain a salt of polyacrylic acid or a salt of carboxymethyl cellulose and a metal salt, and the cycle performance, the first efficiency, and the stability of the aqueous negative electrode slurry were evaluated. Specifically, 1 g of CMC-NH$_4$ and 2 g of AlPO$_4$ were added to 100 g of the negative electrode active material particle and mixed using NAUTA MIXER for 1 hour.

Table 6 shows the results of Examples 4-1 to 4-2.

TABLE 6

SiOx: x = 1, D$_{50}$ = 8 μm; Graphite (natural graphite:artificial graphite = 5:5): D$_{50}$ = 20 μm; SiOx ratio 20 mass %; Li$_2$Si$_2$O$_5$, Li$_2$SiO$_3$; carbon material: average thickness 50 nm; half value width 2.257°, crystallite 3.77 nm; modification method: oxidation and reduction method; A > B, wet blending method

|  | CMC salt | CMC salt content (mass %) | Metal salt | Metal salt content (mass %) | Capacity retention rate (%) | Initial efficiency (%) | Times till gas generation |
|---|---|---|---|---|---|---|---|
| Example 4-1 | CMC-NH$_4$ | 1 | AlPO$_4$ | 2 | 69 | 87.2 | 4 days |
| Example 4-2 | CMC-NH$_4$ | 1 | AlPO$_4$ | 2 | 69 | 87 | 4 days |

The times till gas generation were more increased when a dry blending method was used than in the case of using a wet mixing method.

Examples 5-1 to 5-9

A secondary battery was produced under the same conditions as in Example 1-2 except for changing the crystallinity of the silicon compound particles as shown in Table 7, and the cycle performance, the first efficiency, and the stability of the aqueous negative electrode slurry were evaluated. It is to be noted that the crystallinity in the silicon compound particles can be controlled by changing the vaporization temperature of the raw materials or heat treatment of the produced silicon compound particles. In Example 5-9, the half value width is calculated as 20° or more, but this is a result from fitting using an analytical software, and a peak was not obtained actually. Accordingly, the silicon compound in Example 5-9 is considered as an amorphous substantially.

TABLE 7

SiOx: x = 1, D$_{50}$ = 8 μm; Graphite (natural graphite:artificial graphite = 5:5): D$_{50}$ = 20 μm; SiOx ratio 20 mass %; Li$_2$Si$_2$O$_5$, Li$_2$SiO$_3$; carbon material: average thickness 50 nm; half value width 2.257°, crystallite 3.77 nm; modification method: oxidation and reduction method; A > B, wet blending method

|  | Half value width (°) | Si (111) crystallite size (nm) | Capacity retention rate (%) | Initial efficiency (%) | Times till gas generation |
|---|---|---|---|---|---|
| Example 5-1 | 0.756 | 11.42 | 68 | 87 | 1 day |
| Example 5-2 | 0.796 | 10.84 | 68 | 86.8 | 1 day |
| Example 5-3 | 1.025 | 8.55 | 68 | 86.9 | 2 days |
| Example 5-4 | 1.218 | 7.21 | 69 | 87 | 3 days |
| Example 5-5 | 1.271 | 6.63 | 68 | 87.1 | 3 days |
| Example 5-6 | 1.845 | 4.62 | 69 | 87 | 3 days |
| Example 1-2 | 2.257 | 3.77 | 70 | 87.3 | 3 days |
| Example 5-7 | 2.593 | 3.29 | 72 | 87.3 | 3 days |
| Example 5-8 | 10.123 | 1.524 | 72 | 87.1 | 3 days |
| Example 5-9 | 20.221 | 0 | 73 | 87.1 | 3 days |

Higher initial efficiencies and capacity retention rates were obtained particularly using low-crystalline material in which the half value width was 1.2° or more and the size of the crystallite corresponding to Si(111) face was 7.5 nm or less.

Example 6-1

A secondary battery was produced under the same conditions as in Example 1-2 except for using a silicon compound in which the relation between maximum peak intensity A derived from Si and Li silicate region and the peak intensity B derived from the SiO$_2$-region was A<B, and the cycle performance, the first efficiency, and the stability of the aqueous negative electrode slurry were evaluated. In this case, the amount of Li$_2$SiO$_3$ was reduced by reducing the amount of inserted lithium in modification to decrease the peak intensity A due to Li$_2$SiO$_3$.

TABLE 8

SiOx: x = 1, D$_{50}$ = 8 μm; Graphite (natural graphite:artificial graphite = 5:5): D$_{50}$ = 20 μm; SiOx ratio 20 mass %; Li$_2$Si$_2$O$_5$, Li$_2$SiO$_3$; carbon material: average thickness 50 nm; half value width 2.257°, crystallite 3.77 nm; modification method: oxidation and reduction method; CMC-H$_4$ content: 1 mass %, AlPO$_4$ content: 2 mass %, wet blending method

| Table 8 | A, B | Capacity retention rate (%) | Initial efficiency (%) | Times till gas generation |
|---|---|---|---|---|
| Example 6-1 | A < B | 67 | 86.4 | 3 days |
| Example 1-2 | A > B | 70 | 87.3 | 3 days |

As can be seen from Table 8, the battery properties were more improved when the relation between peak intensities was A>B.

Examples 7-1 to 7-6

A secondary battery was produced under the same conditions as in Example 1-2 except for changing the median diameter of silicon compound particles as shown in Table 9, and the cycle performance, the first efficiency, and the stability of the aqueous negative electrode slurry were evaluated.

TABLE 9

SiOx: x = 1; Graphite (natural graphite:artificial graphite = 5:5); SiOx ratio 20 mass %; Li$_2$Si$_2$O$_5$, Li$_2$SiO$_3$; carbon material: average thickness 50 nm; half value width 2.257°, crystallite 3.77 nm; modification method: oxidation and reduction method; A > B; CMC-H$_4$ content: 1 mass %, AlPO$_4$ content: 2 mass %, wet blending method

| Table 9 | Median diameter (μm) | Capacity retention rate (%) | Initial efficiency (%) | Times till gas generation |
|---|---|---|---|---|
| Example 7-1 | 0.5 | 67 | 87 | 2 days |
| Example 7-2 | 1 | 68 | 87.1 | 3 days |
| Example 7-3 | 3 | 69 | 87.2 | 3 days |

TABLE 9-continued

SiOx: x = 1; Graphite (natural graphite:artificial graphite = 5:5); SiOx ratio 20 mass %; Li$_2$Si$_2$O$_5$, Li$_2$SiO$_3$; carbon material: average thickness 50 nm; half value width 2.257°, crystallite 3.77 nm; modification method: oxidation and reduction method; A > B; CMC-H$_4$ content: 1 mass %, AlPO$_4$ content: 2 mass %, wet blending method

| Table 9 | Median diameter (μm) | Capacity retention rate (%) | Initial efficiency (%) | Times till gas generation |
|---|---|---|---|---|
| Example 1-2 | 8 | 70 | 87.3 | 3 days |
| Example 7-4 | 10 | 71 | 87.3 | 4 days |
| Example 7-5 | 15 | 71 | 87.4 | 4 days |
| Example 7-6 | 20 | 71 | 87.1 | 4 days |

When the median diameter of the silicon compound was 3 μm or more, the retention rate and the initial efficiency were more improved. This is probably due to the silicon compound with the surface area per mass being not too large, which successfully reduced the area on which side reaction occurred. On the other hand, when the median diameter was 15 μm or less, the loss of reversible Li was successfully prevented because of difficulty in particle breakage to hardly form a solid electrolyte interface (SEI) due to the new surface in charging and discharging. When the silicon-based active material particles had a median diameter of 15 μm or less, the negative electrode active material particles did not expand largely in charging, making it possible to prevent the negative electrode active material layer from physical and electrical breakage due to expansion.

Examples 8-1 to 8-4

A secondary battery was produced under the same conditions as in Example 1-2 except for changing the average thickness of the carbon material to cover the surfaces of silicon-based active material particles as shown in Table 10, and the cycle performance, the first efficiency, and the stability of the aqueous negative electrode slurry were evaluated. The average thickness of the carbon material can be controlled by changing the CVD conditions.

TABLE 10

SiOx: x = 1, D$_{50}$ = 8 μm; Graphite (natural graphite:artificial graphite = 5:5): D$_{50}$ = 20 μm; SiOx ratio 20 mass %; Li$_2$Si$_2$O$_5$, Li$_2$SiO$_3$; carbon material exist; half value width 2.257°, crystallite 3.77 nm; modification method: oxidation and reduction method; A > B; CMC-H$_4$ content: 1 mass %, AlPO$_4$ content: 2 mass %, wet blending method

| Table 10 | Average thickness (nm) | Capacity retention rate (%) | Initial efficiency (%) | Times till gas generation |
|---|---|---|---|---|
| Example 8-1 | 5 | 68 | 87 | 4 days |
| Example 8-2 | 10 | 69 | 87.2 | 4 days |
| Example 1-2 | 50 | 70 | 87.3 | 4 days |
| Example 8-3 | 1000 | 70 | 88 | 4 days |
| Example 8-4 | 5000 | 71 | 88.1 | 4 days |

As can be seen from Table 10, when the carbon layer had a film thickness of 5 nm or more, the electric conductivity was improved, and the capacity retention rate and the initial efficiency were successfully improved thereby. On the other hand, when the carbon layer had a film thickness of 5000 nm or less, the amount of silicon compound particles were successfully secured sufficiently in battery design, and did not cause lowering of the battery capacity thereby.

Example 9-1

A secondary battery was produced under the same conditions as in Example 1-2 except for changing the mass ratio of the silicon-based active material particles in the negative electrode active material, and the increment rates of the battery capacities were evaluated.

FIG. 5 is a graph showing relationship between the ratio of silicon-based active material particles relative to the whole amount of negative electrode active material and an increment rate of battery capacities of the secondary battery. The graph indicated by A in FIG. 5 shows an increment rate of the battery capacities when the ratio of the silicon compound particles was increased in the inventive negative electrode active material of the negative electrode. On the other hand, the graph indicated by B in FIG. 5 shows an increment rate of the battery capacity when the ratio of the silicon compound particles without doping Li was increased. As can be seen from FIG. 5, when the ratio of the silicon compound was 6 mass % or more, the increment rate of battery capacity was larger compared to previous one, particularly, the volume energy density was increased remarkably.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode active material comprising:
   a negative electrode active material particle comprising:
      a silicon compound particle containing:
         a silicon compound (SiO$_x$: 0.5≤x≤1.6), and
         a Li compound selected from Li$_2$Si$_2$O$_5$, Li$_2$SiO$_3$, and Li$_4$SiO$_4$, and
      at least one kind of salt selected from salts of polyacrylic acid and salts of carboxymethyl cellulose, together with at least one kind of metal salt selected from Mg(NO$_3$)$_2$, MgCl$_2$, MgSO$_4$, Mg$_3$(PO$_4$)$_2$, AlCl$_3$, Al(NO$_3$)$_3$, and AlPO$_4$.

2. The negative electrode active material according to claim 1, wherein the total amount of the at least one kind of salt selected from the salts of polyacrylic acid and the salts of carboxymethyl cellulose is in a range of 0.1 mass % or more and 5 mass % or less relative to the total amount of the negative electrode active material particle.

3. The negative electrode active material according to claim 1, wherein the at least one kind of salt selected from the salts of polyacrylic acid and the salts of carboxymethyl cellulose is an ammonium salt.

4. The negative electrode active material according to claim 2, wherein the at least one kind of salt selected from the salts of polyacrylic acid and the salts of carboxymethyl cellulose is an ammonium salt.

5. The negative electrode active material according to claim 1, wherein the total amount of the at least one kind of metal salt is in a range of 0.1 mass % or more and 5 mass % or less relative to the total amount of the negative electrode active material particle.

6. The negative electrode active material according to claim 2, wherein the total amount of the at least one kind of metal salt is in a range of 0.1 mass % or more and 5 mass % or less relative to the total amount of the negative electrode active material particle.

7. The negative electrode active material according to claim 3, wherein the total amount of the at least one kind of metal salt is in a range of 0.1 mass % or more and 5 mass % or less relative to the total amount of the negative electrode active material particle.

8. The negative electrode active material according to claim 4, wherein the total amount of the at least one kind of metal salt is in a range of 0.1 mass % or more and 5 mass % or less relative to the total amount of the negative electrode active material particle.

9. The negative electrode active material according to claim 1, wherein the sum of content of the at least one kind of salt selected from the salts of polyacrylic acid and the salts of carboxymethyl cellulose contained in the negative electrode active material particle on the basis of mass is smaller than the sum of content of the at least one kind of metal salt contained in the negative electrode active material particle on the basis of mass.

10. The negative electrode active material according to claim 1, wherein the silicon compound particle has a diffraction peak attributable to Si(111) crystal face in which the half value width (2θ) is 1.2° or more in an X-ray diffraction using Cu-Kα ray, and the size of the crystallite corresponding to the crystal face is 7.5 nm or less.

11. The negative electrode active material according to claim 1, wherein the silicon compound particle satisfies a relationship of A>B where A is a maximum peak intensity derived from Si and Li silicate region given in the chemical shift value of −60 to −95 ppm, and B is a peak intensity derived from $SiO_2$-region given in the chemical shift value of −96 to −150 ppm, each obtained from a $^{29}Si$-MAS-NMR spectrum.

12. The negative electrode active material according to claim 1, wherein the median diameter of the negative electrode active material particle is 3 μm or more and 15 μm or less.

13. The negative electrode active material according to claim 1, wherein the negative electrode active material particle has a surface layer portion containing a carbon material.

14. The negative electrode active material according to claim 13, wherein the average thickness of the carbon material is 5 nm or more and 5000 nm or less.

15. A mixed negative electrode active material, comprising the negative electrode active material according to claim 1 and a carbon-based active material.

16. A method of producing a negative electrode active material containing a negative electrode active material particle including a silicon compound particle, the method comprising:

preparing a negative electrode active material particle, comprising:

preparing a silicon compound particle containing a silicon compound ($SiO_x$: 0.5≤x≤1.6), and inserting Li into the silicon compound particle to form a Li compound contained therein;

making the negative electrode active material particle contain at least one kind of salt selected from salts of polyacrylic acid and salts of carboxymethyl cellulose, together with at least one kind of metal salt selected from $Mg(NO_3)_2$, $MgCl_2$, $MgSO_4$, $Mg_3(PO_4)_2$, $AlCl_3$, $Al(NO_3)_3$, and $AlPO_4$; and using the negative electrode active material particle containing the at least one kind of salt selected from the salts of polyacrylic acid and the salts of carboxymethyl cellulose, together with the at least one kind of metal salt, to produce a negative electrode active material.

* * * * *